United States Patent
Hopp et al.

(10) Patent No.: US 9,068,862 B2
(45) Date of Patent: Jun. 30, 2015

(54) DEVICE AND METHOD FOR OPTICALLY COMPENSATING FOR THE MEASURING TRACK DECENTRALIZATION IN ROTATION ANGLE SENSORS

(75) Inventors: David Hopp, Donaueschingen (DE); Christof Pruss, Ostfildern (DE); Wolfgang Osten, Stuttgart (DE)

(73) Assignee: University of Stuttgart, Stuttgart (DE)

( * ) Notice: Subject to any disclaimer, the term of this patent is extended or adjusted under 35 U.S.C. 154(b) by 326 days.

(21) Appl. No.: 13/395,436

(22) PCT Filed: Sep. 8, 2010

(86) PCT No.: PCT/EP2010/005514
§ 371 (c)(1),
(2), (4) Date: Mar. 9, 2012

(87) PCT Pub. No.: WO2011/029587
PCT Pub. Date: Mar. 17, 2011

(65) Prior Publication Data
US 2012/0168615 A1   Jul. 5, 2012

(30) Foreign Application Priority Data
Sep. 9, 2009   (DE) .................. 10 2009 040 790

(51) Int. Cl.
*G01D 5/34* (2006.01)
*G01D 5/244* (2006.01)
*G01D 5/347* (2006.01)

(52) U.S. Cl.
CPC ........ *G01D 5/24438* (2013.01); *G01D 5/34707* (2013.01); *G01D 5/3473* (2013.01)

(58) Field of Classification Search
CPC .......... G01D 5/34707; G01D 5/34792; G01D 5/3473; G01D 5/24438
USPC ...................................... 250/231.13–231.18
See application file for complete search history.

(56) References Cited

U.S. PATENT DOCUMENTS

| | | | | |
|---|---|---|---|---|
| 5,783,817 A | * | 7/1998 | Gohring .................. | 250/231.14 |
| 2004/0206894 A1 | * | 10/2004 | Oka et al. ................ | 250/231.13 |

(Continued)

FOREIGN PATENT DOCUMENTS

| | | |
|---|---|---|
| CN | 1540292 A | 10/2004 |
| JP | 2004-340929 A | 12/2004 |

OTHER PUBLICATIONS

Office Action issued in corresponding Chinese Application No. 201080040318.2, Mar. 25, 2014.

(Continued)

*Primary Examiner* — Thanh Luu
(74) *Attorney, Agent, or Firm* — Perkins Coie LLP

(57) ABSTRACT

The invention relates to an improved encoding disk for an optical rotation angle sensor or a rotary encoder, an optical rotation sensor or rotary encoder comprising an improved encoding disk, and a method for optically correcting or compensating for an angle measuring error of a rotary encoder, in particular an angle measuring error which is contingent on a displacement or decentralization of the encoding disk. The encoding disk (20) comprises at least one measuring track (22) and at least one compensating track (24), wherein the measuring track (22) is in a first radial region of the encoding disk (20); and the compensating track (24) is centered with regard to the measuring track (22) on a second radial region of the encoding disk (20) so that the center of the measuring track (22) coincides with the center of the compensating track (24). The compensating track (24) is preferably designed such that at least one part of the light incident on a region of the compensating track is deflected by the compensating track (24) radially in the direction of the axis through the common center of the compensating track (24) and the measuring track (22). The direction of the readout light which is deflected by the compensating track preferably intersects the axis through the common center of the compensating track and the measuring track, wherein the distance between the compensating track and said intersection corresponds to the length of the light path between the compensating track and the measuring track. The readout light can be coherent or incoherent. The radius of the compensating track can be less than, greater than, or equal to the radius of the measuring track. The compensating track (24) preferably has a diffractive structure.

22 Claims, 3 Drawing Sheets

(56) References Cited

U.S. PATENT DOCUMENTS

2008/0087805 A1* 4/2008 Kress ................. 250/231.13
2009/0147271 A1* 6/2009 Wright ................. 356/614

OTHER PUBLICATIONS

Office Action issued in corresponding Japanese Application No. 2012-528268, Jun. 6, 2013.

* cited by examiner

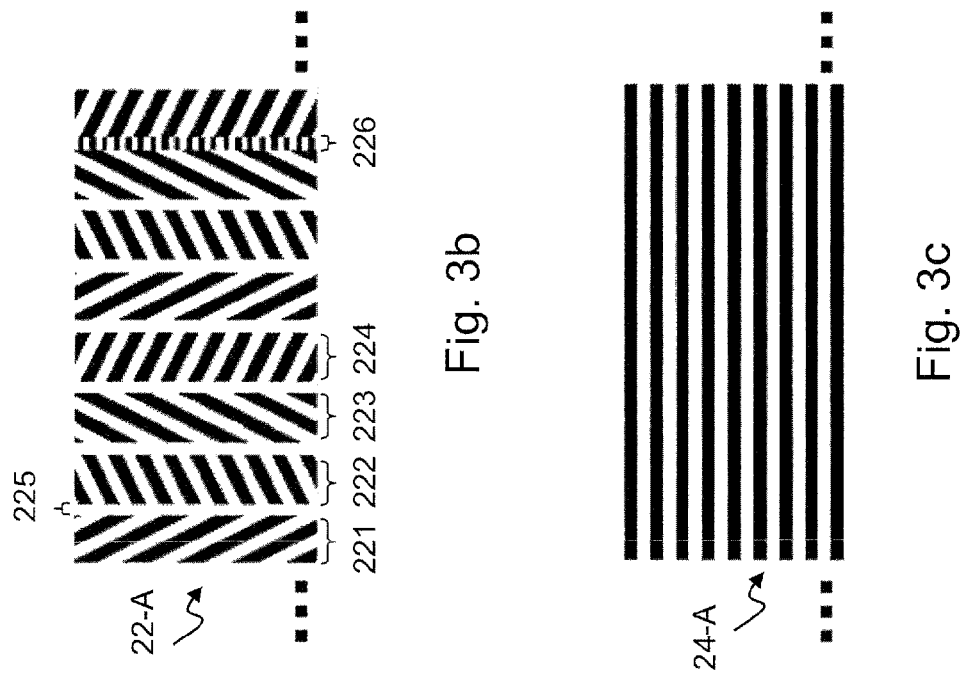
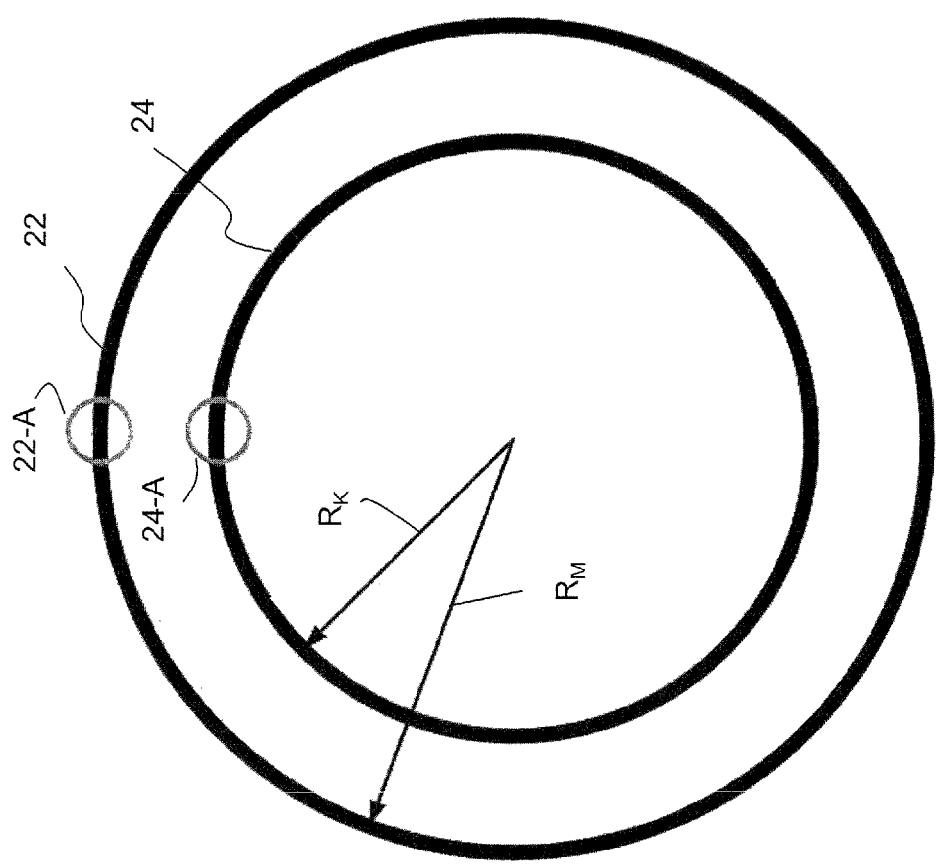

DEVICE AND METHOD FOR OPTICALLY COMPENSATING FOR THE MEASURING TRACK DECENTRALIZATION IN ROTATION ANGLE SENSORS

The invention relates to an encoder disc for an optical rotation angle sensor or rotary encoder, an optical rotation angle sensor or rotary encoder and a method for optical correction or compensation of an angle measurement error in an optical rotary encoder in particular an angle measurement error which is induced in particular by a displacement or decentering of the encoder disc.

The underlying principle of optical rotation angle sensors, also referred to as rotary encoders, is based on a rotatably mounted shaft on which a code disc or encoder disc is fixed. One or more measuring tracks which are illuminated by a stationary light source are applied to this encoder disc. By the relative movement of the encoder disc with respect to the light source a specific area of the measuring tracks is illuminated as a function of the angular position of the shaft. The resulting light field is read out by means of a detector unit, e.g. a photodiode. This signal can be assigned directly or indirectly to the angular position or the rotary movement of the disc and thus of the shaft.

Optical rotary encoders are operated in transmission mode (e.g. according to the light barrier principle, Moiré, etc.), in reflection mode and also on the basis of diffractive deflection (diffraction). Regardless of the resolution, in all these encoding principles the accuracy of the rotary encoder, i.e. the discrepancy between the actual shaft angle and the optically measured angle, is directly dependent upon the assignability of disc movement and shaft movement. Decentering of the measuring track or the disc axis with respect to the shaft axis, i.e. a so-called nutation of the measuring track, leads to an angle measurement error which cannot be disregarded. This is expressed in a cosine deviation over the entire range of the rotary movement.

In order to achieve a high degree of accuracy it is essential to center, i.e. adjust, the measuring track or the encoder disc as accurately as possible with respect to the shaft. This requires high outlay during installation and is therefore costly. In spite of the high outlay a small decentering error can never be completely avoided by mechanical means. For this reason strategies are sought to compensate for this unavoidably occurring nutation of the measuring track.

Previous approaches to a solution mainly pursue the strategy of eliminating the angular errors in the evaluation:

Thus the nutation of the encoder disc can be determined for example by the use of two or more optical readout units which are disposed at a known angle with respect to one another. The angle signal can then be corrected by the use of electronics. Alternatively, it is also possible to use separate measuring tracks of which the signal constitutes a direct measurement of the wobble of the disc.

A disadvantage of previous compensation solutions lies in the need for several readout units or additional measuring tracks. Moreover with this method the compensation always takes place only after readout of the angle and is therefore associated with the additional use of electronics.

The object of the invention is to provide an efficient method and a corresponding device for correction or compensation of the angle measurement error in an optical rotary encoder, in particular a method for correcting or compensating for the angle measurement error which is caused by a displacement or decentering of the rotary encoder relative to the shaft axis. Further objects of the invention are to simplify or to render more efficient the adjustment of the encoder disc relative to the shaft axis and also the determination of the correct angle or the correct angular position.

These objects are achieved by an encoder disc for an optical rotation angle sensor or rotary encoder with the features set out in claim 1, an optical rotation angle sensor or rotary encoder with the features set out in claim 10 and a method for correction or compensation of an angle measurement error (in particular an angle measurement error which is caused by displacement or decentering of the encoder disc) in an optical rotary encoder with the features set out in claim 17.

The proposed solution is based on an optical compensation for the disc nutation.

In particular, according to a first aspect of the invention an improved encoder disc for an optical rotation angle sensor or rotary encoder is proposed. The encoder disc comprises at least one measuring track and at least one compensating track, wherein the measuring track is disposed in a first radial zone of the encoder disc;

the compensating track is centered or disposed concentrically with respect to the measuring track on a second radial zone of the encoder disc (preferably different from the first radial zone) so that the center or the center of rotation of the measuring track coincides with the center or the center of rotation of the compensating track.

The measuring track is designed in such a way that when a scanning zone of the measuring track is illuminated at least one optical measurement beam is produced or generated, wherein at least one optical parameter of the measurement beam is modulated as a function of the angle to be measured.

A radial zone of the encoder disc is in particular an annular zone of the encoder disc, the center of which (substantially) coincides with the common center of the compensating track and the measuring track and extends substantially over the entire circumference of the encoder disc (but not over the entire surface of the encoder disc). Different radial zones are in particular zones which do not overlap one another. Accordingly the compensating track and the measuring track are preferably disposed in such a way that they do not overlap one another or are not nested in one another in one and the same radial zone. However, it is also possible to dispose the compensation track and the measurement track nested in one and the same radial zone.

In an optical rotary encoder which has the encoder disc with one or more measuring tracks the rotating, e.g. diffractive, measuring track is illuminated by a light spot (illuminating spot), in particular by a focused light spot. However, due to the nutation of the encoder disc the point to be illuminated of the measuring track or the scanning zone of the measuring track moves in both the tangential and the radial direction relative to the illumination or to the illuminating beam, which leads to the angle measurement error described above. The measuring track can be designed in such a way that a radial displacement of the encoder disc does not cause a signal change. On the other hand, the relative movement with respect to the illumination in the tangential direction must be corrected by the functional principle of the rotation angle sensor or rotary encoder.

In this case the radial direction relates to the axis between the center of the point to be illuminated (or the center of the scanning zone) and the center point of the shaft. The tangential direction relates to the direction perpendicular to the radial direction and perpendicular to the axial direction, wherein the axial direction coincides with the shaft axis. The encoder disc is generally disposed in such a way that the axial direction is perpendicular to the plane of the encoder disc.

According to the invention an optical compensation or correction of the angle measurement error described above is proposed, preferably without additional readout unit and/or electronics. This is made possible in particular by the use of a modified encoder disc which has in addition to the at least one measuring track at least one further track (e.g. a further diffractive track), the so-called compensating track. In this case the encoder disc may be a round disc with preferably constant thickness, wherein the measuring track and compensating track can be applied to one of the surfaces of the encoder disc.

The optical correction of the nutation of the encoder disc and in particular the associated tangential displacement or decentering of the encoder disc with respect to the shaft and the corresponding tangential displacement of the encoder disc relative to the illumination as the focused light spot (illumination spot) is "entrained" with the tangential movement of the diffractive measuring track or the encoder disc. This is achieved by the compensating track which is centered or located concentrically with respect to the measuring track, preferably on another radial zone or radius of the rotating encoder disc and has a suitable structure, e.g. a mirror structure or a diffractive structure. The compensating track and measuring track which are centered or disposed concentrically with respect to one another are designed and disposed in such a way that they have a common axis of rotation. Thus the center or the center of rotation of the compensating track coincides with the center or center of rotation of the measuring track.

The compensating track is in particular designed in such a way that with illumination of one zone of the compensating track at least one beam is produced or generated which can be directed onto the measuring track for example by means of a suitable optical or optoelectronic deflecting device. In other words, the compensating track is designed in particular in such a way that illuminating light (readout light) which falls onto a zone of the compensating track at a predetermined or predeterminable (adjustable) illumination angle (e.g. normal with respect to the plane of the encoder disc) is deflected by the compensating track in such a way that at least a part of the deflected illumination light can be directed or focused onto a predetermined or predeterminable scanning zone of the measuring track directly or indirectly, i.e. by means of a suitable optical or optoelectronic deflecting device. The deflecting device preferably comprises at least one optical element (e.g. a mirror, a retroreflector, a prism, in particular a pentaprism, etc.) which is stationary relative to the light source. The deflecting device is preferably stationary relative to the light source. The light source can also be stationary.

Due to the preceding optical deflection of the illuminating beams onto the compensating track the illumination spot (which is intended to illuminate the scanning zone of the measuring track) generated by the illuminating light does not remain static but is "entrained" with the displacement of the encoder disc and thus with the compensating track and the measuring track.

Thus the compensating track serves to deflect the illuminating light incident on a zone of the compensating track as a function of the decentering of the encoder disc disposed in an optical rotary encoder with respect to the shaft or to the shaft axis. Offsetting or decentering of the encoder disc produces a change of angle of the illuminating light beam deflection.

Thus when a zone (or a spot) of the compensating track is illuminated by a stationary light source and/or at a predetermined or predeterminable illumination angle (e.g. in the axial direction) the incident illuminating light is deflected by the compensating track. At least a part of the deflected illuminating light can be directed or focused onto the actual measuring track for example by means of a suitable optical or optoelectronic deflecting device. The deflection may be configured in such a way that the optical path length from the compensating track to the measuring track corresponds to the optical path length from the compensating track to the axis of rotation thereof. The consequence of this is that the illumination of the measuring track always takes place at the tangential level of the axis of rotation thereof.

If the encoder disc moves in the tangential direction with respect to the light source due to the mechanical nutation, the illumination on the measuring track or the illumination spot moves as a function of the tangential displacement. In this case the measuring track is always illuminated at substantially the same tangential position, irrespective of the nutation of the encoder disc, by a suitable selection of the structure and the parameters of the compensating track and optionally by a suitable deflection device. Thus the potential angle error or angle measurement error can be compensated optically, so that the correct angle can be read out.

The compensating track may be of different design. The compensating track may for example have a mirror structure (e.g. a mirror surface running round at a suitable angle) or a prism structure.

The compensating track preferably has a diffractive structure. The diffractive compensating track may be designed in such a way that the beams of the Nth, e.g. the first, diffraction order which are diffracted onto the compensating track can be directed or focused onto a predetermined scanning zone of the measuring track for example by means of a suitable optical deflecting device. Thus the diffractive compensating track serves for deflection of the Nth (preferably first) diffraction order as a function of the decentering of the encoder disc disposed in an optical rotary encoder with respect to the shaft or to the shaft axis of the optical rotary encoder.

The diffractive compensating track may comprise at least one diffraction grating which extends in the radial direction substantially over the entire circumference of the encoder disc. The diffraction grating may be a reflective or a transmissive diffraction grating. The diffraction grating may also be a holographic diffraction grating. With regard to the parameters of the diffraction grating, such as grating constant and/or angular arrangements of the grating lines, there are in principle no limitations. The grating constant and/or the angular arrangement of the grating lines of the diffraction grating can be suitably selected as a function of the area of use, e.g. as a function of the wavelength of the illuminating light, and/or the geometry, arrangement and/or dimensions of the individual components of the optical arrangement of the rotary encoder, and/or the refractive index of the material of the encoder disc, so that at least a part of the diffracted beams is directed directly or indirectly onto a predetermined or predeterminable scanning zone of the measuring track by means of a suitable optical deflection device.

In one example the compensating track can be designed as an axicon structure, i.e. at least a part of the illuminating light (readout light) incident onto the encoder disc in a predetermined direction (e.g. in the axial direction) is deflected by the compensating track radially in the direction of the axis through the common center of the compensating and measuring tracks. In a diffractive compensating track for example the illuminating light incident onto the encoder disc is divided into diffraction orders in such a way that the beams of the Nth (e.g. the first) diffraction order are always deflected in the direction of the center of the compensating track and thus also of the center of the measuring track. In a plane which is parallel to the plane or surface of the encoder disc (or parallel to the encoder disc) the projection of the deflected light beam of the Nth diffraction order or the virtual prolongation of the projection of the deflected light beam of the Nth diffraction order extends in particular through the common center of rotation or center of the compensating track and the measuring tack. The direction of the illuminating light (readout light) deflected by the compensating track has a point of intersection with the axis through the common center of the compensating and measuring tracks, wherein the distance between the compensating track and this point of intersection corresponds to the length of the light path between the compensating track and the measuring track.

However, it is possible to design the compensating track in such a way that at least a part of the illuminating light illuminating the compensating track is deflected in a direction different from the direction of the common center of the compensating and measuring tracks. In a diffractive compensating track the beams of the Nth (e.g. the first) diffraction order can be deflected in a direction different from the direction of the common center of the compensating and measuring tracks. This can be achieved for example by one or more diffraction gratings with different angular orientations of the grating lines and/or grating constants. The direction of deflection of the beams, e.g. the beams of the Nth diffraction order, may be arbitrary. With a suitable optical or optoelectronic deflecting device, comprising for example at least one mirror and/or at least one retroreflector, and/or at least one prism (e.g. a pentaprism), and/or other optical elements the beams of the Nth (e.g. the first) diffraction order can then be deflected in the direction of the center of rotation of the compensating track. In other words, the compensating track can be designed in such a way that at least a part of the illuminating light (readout light) incident on the compensating can be deflected directly or indirectly (i.e. by means of a suitable optical or optoelectronic deflecting device) in the direction of the common center of the compensating and measuring tracks.

Thus in a further example the compensating track can be designed in such a way that light, preferably coherent light incident onto a zone of the compensating track at a predetermined or predeterminable illuminating angle, is divided into diffraction orders in such a way that the beams of the Nth diffraction order, where N is a whole number, are deflected tangentially with respect to the compensating track in the illuminated zone. In this case the compensating track may have for example a grating structure or a diffraction grating with grating lines oriented radially (i.e. in the direction of the center of rotation of the compensating track).

The deflection of the Nth (e.g. the first) diffraction order takes place as a function of the wavelength and/or grating constant of the diffractive structure of the compensating track or at a constant angle, irrespective of the tangential displacement or decentering of the encoder disc.

If a zone (or a spot) of the compensating track is illuminated by a stationary light source and/or at a predetermined or fixed or adjustable angle (e.g. in the axial direction), the incident light is deflected or diffracted as described above. If a part of the illuminating beams of the compensating track (e.g. the beams of the Nth diffraction order) deflected by the compensating track are suitably deflected by means of a suitable optical or optoelectronic deflecting device, comprising for example optical elements (mirrors, prisms, and/or other optical and/or optoelectronic elements) which are stationary relative to the light source, then these elements can be directed or focused onto the actual measuring track according to the deflection or diffraction on the compensating track. By a suitable design and arrangement of the components (compensating track and/or deflecting device) the deflection can be configured in such a way that the measuring track is illuminated by the readout light, independently of the offset, always at the same angular position in the measuring track so long as the angle of rotation of the encoder disc is constant. In particular the deflection can be configured in such a way that the optical path length from the compensating track to the measuring track corresponds precisely to the optical path length from the compensating track to the axis of rotation thereof. The consequence of this is that the illumination of the measuring track always takes place at the tangential level of its axis of rotation.

If due to the mechanical nutation the encoder disc and thus the axis of rotation of both tracks moves in the tangential direction with respect to the light source, then—as described above—the illumination also moves on the measuring track or the illumination spot parallel to the displacement. In this case the measuring track is always illuminated at substantially the same tangential position irrespective of the nutation of the encoder disc. Thus the potential angle error or angle measurement error can be compensated optically so that the correct angle can be read out.

The diffractive compensating track can preferably applied to the encoder disc in a production process or simultaneously with the actual diffractive measuring track. As a result both tracks can be centered or oriented very precisely with respect to one another. This in particular enables adjustment-free installation of the encoder disc.

Depending upon the construction of the rotation angle sensor or the rotary encoder (e.g. incident light, transmitted light, etc.) the arrangement of the measuring track and compensating track as well as the beam guiding and/or the deflection can be adapted variably.

As already stated above, the compensating track may be designed in such a way that light incident normally (with respect to the plane of the encoder disc) on a zone of the compensating track is divided into diffraction orders. In this case the predetermined illuminating angle is substantially 90°. The illuminating angle is defined as the angle between the optical axis of the illuminating light or illuminating beam and the plane of the encoder disc. The illuminating angle can be adjustable.

Likewise the compensating track may be designed in such a way that the beams of the first diffraction order (N−1) are directed or focused onto the measuring track directly or indirectly by means of a deflecting device.

The radius and/or the width of the compensating track can vary as a function of the respective field of use. Thus the radius of the compensating track can be equal to or less than approximately 500 mm, and in particular in the range from approximately 3 mm to approximately 15 mm, preferably from approximately 5 to approximately 10 mm, particularly preferably approximately 8 mm. The width of the compensating track can be for example in the range from approximately 0.5 to approximately 5 mm, preferably in the range from approximately 1 to approximately 3 mm, particularly preferably approximately 2 mm.

The measuring track of the encoder disc may be structured or encoded suitably (e.g. in a manner which known per se), so that when the measuring track is illuminated, in particular when a scanning zone of the measuring track is illuminated, at least one optical measuring beam is produced or generated, wherein at least one optical parameter (e.g. intensity, phase, etc.) of the measurement beam is modulated directly or indirectly as a function of the angle to be measured. The (illuminated) scanning zone can be for example a substantially circular zone, wherein the diameter of the scanning zone can be substantially equal to or less than the width of the measuring track. The scanning zone can for example have a diameter of approximately 25 μm to approximately 10 μm.

The measuring track can be a diffractive measuring track or can have a diffractive structure. In particular the measuring track can comprise at least one diffraction grating. At least a part of the beams of the Nth (e.g. the first) diffraction order which are divided or diffracted by means of the diffractive measuring track, and thus form the measurement beam or the measurement beams, can be detected by means of one or more photodetectors and can be assigned directly or indirectly to a specific angular position. The diffraction grating may be a reflection grating or a transmission grating. The measuring track preferably comprises at least two different diffraction gratings which generate two different (e.g. phase-shifted) signals.

The measuring track is preferably designed in such a way that a radial displacement of the encoder disc (with respect to the illumination or with respect to the shaft axis) does not cause any change to the signal. Thus for example the individual diffraction gratings which form the measuring track are curved corresponding to the radius of curvature, which leads to a constant deflection of the light relative to the angular position. The overall sequence of the diffractive diffraction gratings can be displayed in polar co-ordinates and produced accordingly.

The radius and/or the width of the measuring track can vary as a function of the respective field of use. Thus the radius of the measuring track may be for example equal to or less than approximately 500 mm, and in particular in the range from approximately 10 mm to approximately 20 mm, preferably from approximately 10 mm to approximately 15 mm, particularly preferably approximately 13 mm. The width of the measuring track may for example be in the range from approximately 0.3 to 3 mm, preferably in the range from approximately 0.5 to 2 mm, particularly preferably approximately 1 mm.

The measuring track and the compensating track are of annular construction. The annular measuring and compensating tracks are each delimited in particular by two concentric circles. The radius of the outer circle predetermines the radius of the respective track. The width of the respective track corresponds to the difference between the radius of the outer circle and the radius of the inner circle which delimit the respective track. The common center of the compensating track and the measuring track coincides with the center or the central point of the circle or of the ring.

The radius of the compensating track may be smaller than the radius of the measuring track. Likewise it is possible for the radius of the compensating track and the measuring track to be equal.

The encoder disc may be a reflection or a transmission encoder disc. The encoder disc can be read out in transmitted light or in incident light.

A further aspect of the invention relates to an optical rotation angle sensor or rotary encoder comprising:
the (improved) encoder disc according to a preferred embodiment of the invention;
an optical or optoelectronic scanning device which is designed in such a way as to illuminate a scanning zone of the measuring track of the encoder disc.
The scanning device comprises
an illuminating device which is designed in such a way as to illuminate a zone of the compensating track of the encoder disc with light (readout light). The light may be coherent or incoherent light, which is incident at a predetermined or fixed or defined or predeterminable (adjustable) illuminating angle on the compensating track or on a zone of the compensating track. In this case the scanning zone of the measuring track is illuminated by at least a part of beam produced or generated by means of illumination of the compensating track and preferably deflected onto the measuring track by means of a deflecting device.

The scanning device may also comprise a deflecting device which is designed and disposed in such a way that it deflects onto the scanning zone of the measuring track the at least one beam which is produced or generated by illumination of the compensating track.

As already described above, the compensating track can have a diffractive structure. The at least one beam which is produced or generated by illumination of the compensating track can be shaped or formed by at least a part of the beams (S1) of the Nth diffraction order divided by diffraction on the compensating track. In other words the at least one beam which is produced or generated by illumination of the compensating track may comprise at least a part of the beams of the Nth diffraction order (where N is a whole number) divided by diffraction on the compensating track.

As already described above, the rotary encoder according to the invention enables an optical correction of the angle measurement error, in particular the angle measurement error caused by the nutation of the encoder disc and the associated tangential decentering of the encoding disc with respect to the shaft, because the focused light spot of the illumination (illumination spot) is "entrained" with the tangential movement of the diffractive measuring track or the encoder disc. This is achieved in particular by the (e.g. diffractive) compensating track which is disposed or applied so as to be centered of concentric with respect to the measuring track, preferably on another radial zone or radius of the (rotating) encoder disc. The beams (e.g. the beams of the Nth (e.g. the first) diffraction order in a diffractive compensating track) which are deflected by the compensating track are directed or focused onto the measuring track directly or indirectly, i.e. by means of a suitable deflection device. Thus it can be ensured that the beams which are directed directly or indirectly onto the measuring track by the deflecting device always illuminate the measuring track at a substantially tangential position. Thus the potential angle error or angle measurement error can be optically compensated or corrected. In one example beams deflected by the compensating track (or the beams generated by illumination of the compensating track) are deflected directly or indirectly in the direction of the common center of the measuring track and the compensating track, irrespective of the tangential decentering of the encoder disc. The scanning device and in particular the compensating track and/or the deflecting device are designed and disposed in such a way that the direction of the illuminating light (readout light) deflected by the compensating track has an intersection with the axis through the common center of the compensating track and measuring track and the distance between the compensating track and this intersection corresponds to the length of the light path between the compensating track and the measuring track.

Depending upon the construction of the rotation angle sensor or the rotary encoder (e.g. incident light, transmitted light, etc.) the arrangement of the measuring track and the compensating track as well as the beam guiding can be variably adapted to the deflection.

The deflecting device can comprise one or more optical or optoelectronic components. Thus the deflecting device can comprise at least one mirror, and/or at least one prism, in particular a retroprism, and/or at least one lens, and/or other optical and/or optoelectronic components.

The optical or optoelectronic scanning device can also comprise a light source (e.g. a laser and/or a light-emitting diode and/or another light source) and optionally further optical elements (e.g. a collimator and/or a focusing device with one or more lenses, etc.). The light source can be a stationary light source, in particular light source which is stationary with regard to its spatial position (and in particular with regard to its spatial position relative to the shaft axis). The deflecting device is preferably (at least in parts) stationary relative to the light source.

The scanning device is also preferably designed in such a way that the optical path length from the compensating track to the measuring track corresponds to the axis of rotation thereof. The axis of rotation of the compensating track extends through the center of rotation of the compensating track (and thus also through the center of rotation of the measuring track). Thus the illumination of the measuring tack can take place at the tangential level of its axis of rotation.

Furthermore the optical rotary angle sensor or rotary encoder can comprise a detection device, wherein the detection device is designed in such a way that it detects at least a part of the optical measurement beam produced or generated by illumination of the measuring track.

The detection device can comprise one or more photodetectors or photodetector arrays (e.g. photodiodes, phototransistors, CCD camera(s) etc.). The detection device can also comprise further optical and/or optoelectronic elements (e.g. one or more mirrors, lenses, prisms, filters, etc.).

Furthermore, the optical rotary encoder can comprise a signal evaluation device, wherein the signal evaluation device is designed in such a way that it can determine the absolute or relative angle to be measured with the aid of the signal generated by the detection device or the signals generated by the detection device. In other words the signal evaluation device can be designed in such a way that the signal generated by the detection device or the signals generated by the detection device can determine the absolute or relative angle to be measured. In other words, the signal evaluation device is designed in such a way that the signal generated by the detection device or the signals generated by the detection device can be assigned directly or indirectly to a specific angular position or rotary movement of the encoder disc and thus of the shaft.

The optical rotation angle sensor or rotary encoder can be operated in transmitted light (e.g. according to the light barrier principle, Moiré, etc.), in reflection and/or on the basis of diffractive deflection (diffraction). In particular the optical rotary encoder can be an incident light or transmitted light rotary encoder.

The angle error compensation principle described above can be applied both to purely incremental and also to absolutely encoded rotation angle sensors or rotary encoders. Thus the optical rotary encoder can be an incremental or an absolutely encoded (absolute) rotary encoder.

A further aspect of the invention relates to a method for (optical) correction or compensation of an angle measurement error in an optical rotary encoder, in particular an angle measurement error, which is caused by a displacement or decentering of the encoder disc of the optical rotary encoder. The method comprises the steps:
  providing an (improved) encoder disc according to a preferred embodiment of the invention;
  illuminating a zone of the compensating track with light or with a light spot at a predetermined illumination angle; wherein at least one beam is produced or generated; and
  deflecting at least a part of the beam produced or generated by illumination of the compensating track in such a way that a scanning zone of the measuring track is illuminated by at least a part of the deflected beam.

The method can also comprise detecting at least a part of at least one measurement beam produced or generated by the illumination of the scanning zone of the measuring track. Thus at least one corresponding detection signal is produced or generated. Furthermore the method can include evaluating the at least one detection signal and/or determining an absolute or relative angle, wherein the determined angle can be assigned directly or indirectly to a specific angular position or rotary position of the encoder disc and thus of the shaft.

A further aspect of the invention relates to an arrangement for use in optical rotary encoders for optical compensation of the resulting angle measurement error with an offset between the axis of rotation and the center of the material measure, wherein
  concentrically with respect to a measuring track a compensating track is disposed on an encoder disc; and wherein the arrangement is designed in such a way that
  a readout light initially falls onto the compensating track;
  the compensating track deflects the readout light radially in the direction of the axis through the common center of the compensating track and measuring track;
  the deflected readout light is deflected by at least one optical or optoelectronic device (deflecting device) which is stationary relative to a light source;
  the readout light thus deflected strikes the measuring track;
  the arrangement of components is selected in such a way that the measuring track is always illuminated at the same angular position in the measuring track by the readout light, irrespective of the offset, so long as the rotation angle of the encoder disc is constant.

The direction of the readout light deflected by the compensating track has a point of intersection with the axis through the common center of the compensating track and the measuring track, wherein the distance between the compensating track and this point of intersection corresponds to the length of the light path between the compensating track and the measuring track. The readout light can be coherent or incoherent. The radius of the compensating track can be smaller than greater than or equal to the radius of the measuring track.

Furthermore, an aspect of the invention relates to a use of an encoder disc according to a preferred example of the invention in an optical rotary encoder, wherein the encoder disc is used in such a way that illuminating light incident on a zone of the compensating track is deflected by the compensating track and wherein at least a part of the deflected illuminating light illuminates a scanning zone of the measuring track, preferably after deflection by means of a deflecting device. When the scanning zone of the measuring track is illuminated, at least one optical measuring beam is generated, wherein at least one optical parameter of the measuring beam is modulated as a function of the angle to be measured.

With the aid of the encoder disc according to the invention, and/or the optical rotary encoder according to the invention and/or the method for compensation of the angular measurement error in an optical rotary encoder it is possible for the problem of the angle measurement error occurring in optical rotary encoders in the event of nutation of the encoder disc to be substantially eliminated by a purely optical principle. Thus the compensation for the nutation or the decentering of the encoder disc with respect to the shaft axis already takes place before the determination of the angle signal. Basically no additional optical readout units or electronic components are required, which leads to simplification of the design of the rotary encoder and/or the method for determining the correct angle. Furthermore the relatively high (partially manual) outlay for precise adjustment of the encoder disc with respect to the shaft can be considerably reduced or avoided. This makes possible an absolute or incrementally encoded optical rotary angle sensor or rotary encoder, in particular a rotary encoder on the basis of a diffractive material measure, in particular with adjustment-free installation.

The angle error compensation principle described above can be applied both to optical rotary encoders based on diffractive deflection and also to optical rotary encoders based on other optical principles (such as e.g. Moiré, light barrier, etc.). In this case the compensating track and the measuring track are produced or applied in one operation in order to ensure a centered or concentric arrangement of the two tracks.

Further objects, features and advantages of the present invention are apparent from a detailed description of preferred embodiments of the present invention with reference to the drawings, in which:

FIG. 1 shows a compensation diagram of the angle measurement error according to an example according to the invention, wherein

FIG. 3 shows a schematic representation of the structure and the arrangement of the measuring and compensating tracks of the encoder disc of the rotary encoder shown in FIG. 2, wherein FIG. 3a shows a view of a partial section of the encoder disc from above;

FIG. 3b shows an enlarged view of a partial section of the measuring track; and

FIG. 3c shows an enlarged view of a partial section of the compensating track.

Figure 1B:
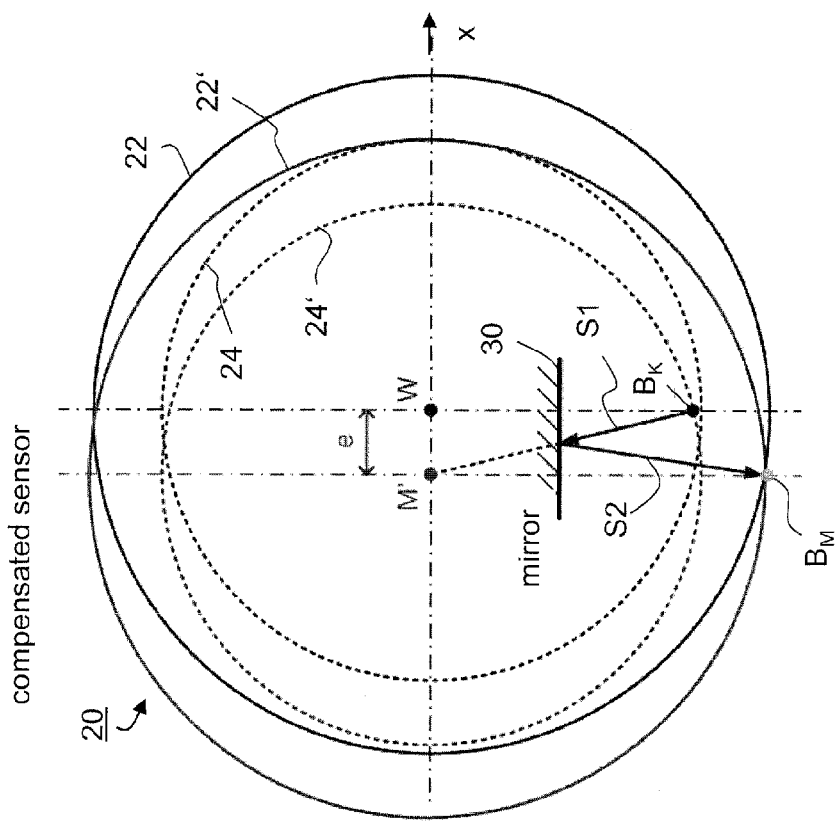
FIG. 1b shows a compensated rotary encoder.
Figure 1A:
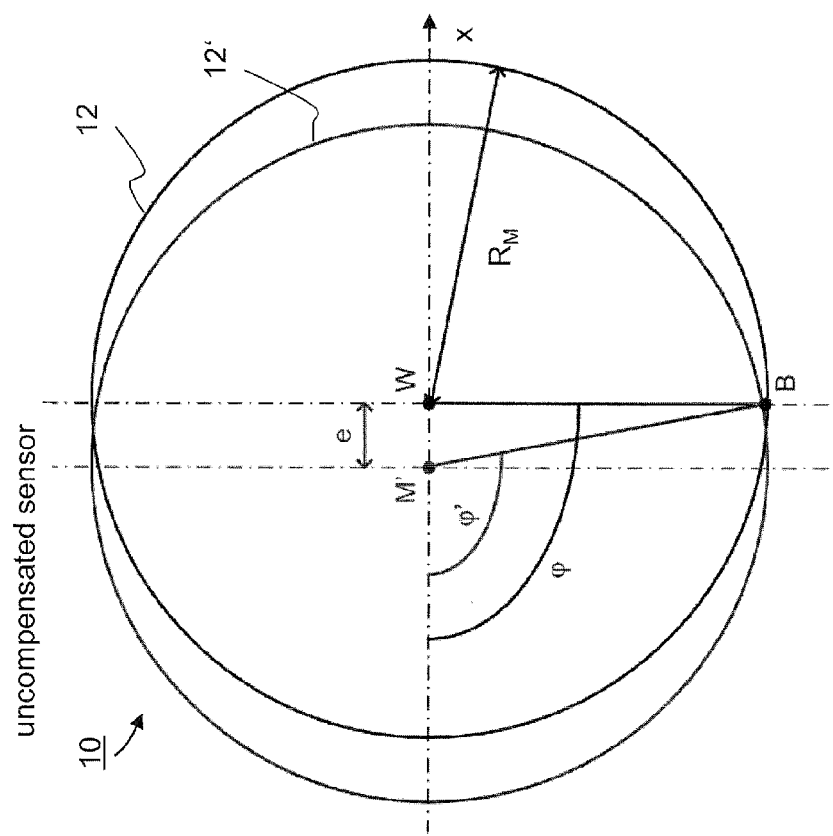
FIG. 1a shows an uncompensated rotary encoder.

The principle of the angle measurement and correction of a preferred rotation angle sensor or rotary encoder is shown schematically in FIG. 1, wherein FIG. 1a shows the principle of the angle measurement of a conventional uncompensated rotation angle sensor or rotary encoder and FIG. 1b shows the principle of angle measurement and the optical angle correction of a compensated rotation angle sensor or rotary encoder according to an example of the invention.

The encoder disc 10 of an uncompensated rotary encoder has a circular or annular measuring track 12 with a radius RM. The center of the measuring track coincides with the center point of the circular or annular measuring track. The encoder disc 10 is mounted rotatably about a shaft axis. The shaft axis is normal with respect to the drawing plane or normal with respect to the plane of the encoder disc or to the surfaces of the (disc-shaped) encoder disc and extends through the center point of the shaft W. When there is no tangential decentering of the encoder disc with respect to the shaft axis, the center of the measuring track M coincides with the center point of the shaft W. In the event of a tangential decentering of the encoder disc with respect to the shaft or to the shaft axis caused by the nutation of the encoder disc, the center M' of the decentered measuring track 12' is located at a distance "e" in the tangential direction "x" from the center point of the shaft W.

The illuminating light (readout light) emitted by a (stationary) light source strikes the measuring track 12 at a predetermined or predeterminable angle (e.g. perpendicular or normal or in the axial direction). Thus a scanning zone of the measuring track is illuminated by an illumination spot B.

When the measuring track 12 is decentered tangentially the decentered measuring tack 12' is illuminated in a different tangential (scanning) zone from the non-decentered measuring track. Thus instead of the correct or true angle φ the angle φ' is determined. The result is an angle measurement error (φ−φ').

The compensated rotary encoder according to an example according to the invention has a (disc-shaped) encoder disc 20 which has a circular or annular diffractive compensating track 24 in addition to an annular or circular measuring track 22. The compensating track is disposed centrally or concentrically with respect to the measuring track 22 in another or different radial zone of the encoder disc 20. In the encoder disc 20 shown in FIG. 1b the radius of the compensating track 24 is smaller than the radius of the measuring track 22. The center of rotation or center of the measuring track coincides with the center of rotation or center of the compensating track and with the center point of the circular or annular measuring and compensating tracks. In other words the measuring track and compensating track have a common center of rotation or center or center point M.

The encoder disc mounted rotatably about a shaft axis. If there is no decentering of the encoder disc relative to the shaft axis, the common center of the measuring and compensating track M coincides—as explained in connection with FIG. 1—with the center point of the shaft W. When the encoder disc is decentered with regard to the shaft or the shaft axis due to the nutation of the encoder disc, the common center M' of the decentered measuring and compensating track is located at a distance "e" in the tangential direction "x" from the center point of the shaft W.

Furthermore, the beam path of the illumination is shown schematically in FIG. 1b for the tangential decentering "e" of the encoder disc 20. A (specific) zone of the decentered compensating track 24' is illuminated by an illumination spot $B_K$ by the incident illumination light or illuminating beam. The diameter of the illumination spot or of the illuminated zone of the compensating track can be substantially equal to or less than the width of the compensating track. The diameter of the illuminated zone of the compensating track is preferably approximately 25 µm to 2 mm, preferably approximately 0.1 mm to 1 mm, particularly preferably approximately 0.5 mm. The compensating track 24 can be illuminated in particular by a light spot, e.g. by a focused diffraction-limited light spot.

The illumination light incident on the decentered compensating track 24' at a predetermined angle (e.g. in the axial direction) or the incident illuminating beam is divided by the decentered compensating track 24' into diffraction orders. By a suitable selection of the wavelength and/or the grating constant of the diffractive compensating track, the beams of the first diffraction order S1 are deflected (in particular independently of the tangential decentering of the compensating and measuring track) in the direction of the common center of the compensating track and the measuring track. The beams of the first diffraction order S1 are deflected and directed onto the (optionally decentered) measuring track by means of an optical deflecting device comprising a mirror 30 and optionally further optical elements. A scanning zone of the measuring track is illuminated by the deflected beams S2 of the first diffraction order (or at least by a part of the deflected beams of the first diffraction order). Due to the deflected beams S2 of the first diffraction order an illumination spot $B_M$ is produced by which the decentered measuring track 22' or a scanning zone of the decentered measuring track 22' is illuminated.

The illumination or the illumination spot $B_M$ on the measuring track moves with the displacement of the encoder disc 20 (and thus of the common axis of both tracks) due to the mechanical nutation in the tangential direction with respect to the light source parallel to the displacement of the encoder disc 20. However, regardless of the nutation of the encoder disc 20 the measuring track 22 is always illuminated at substantially the same tangential position. The potential angle measurement error can therefore be optically compensated, so that the correct angle can be read out.

The deflection can be configured in such a way that the optical path length from the compensating track 24 or 24' to the measuring track 22 or 22' corresponds to the optical path length from the compensating track to the axis of rotation thereof. The consequence of this is that the illumination of the measuring track 22 always takes place at the tangential level of its axis of rotation.

The beams diffracted by the measuring track 22 are sensed or detected by a detection device (not shown in FIG. 1) with one or more photodetectors.

Figure 2:
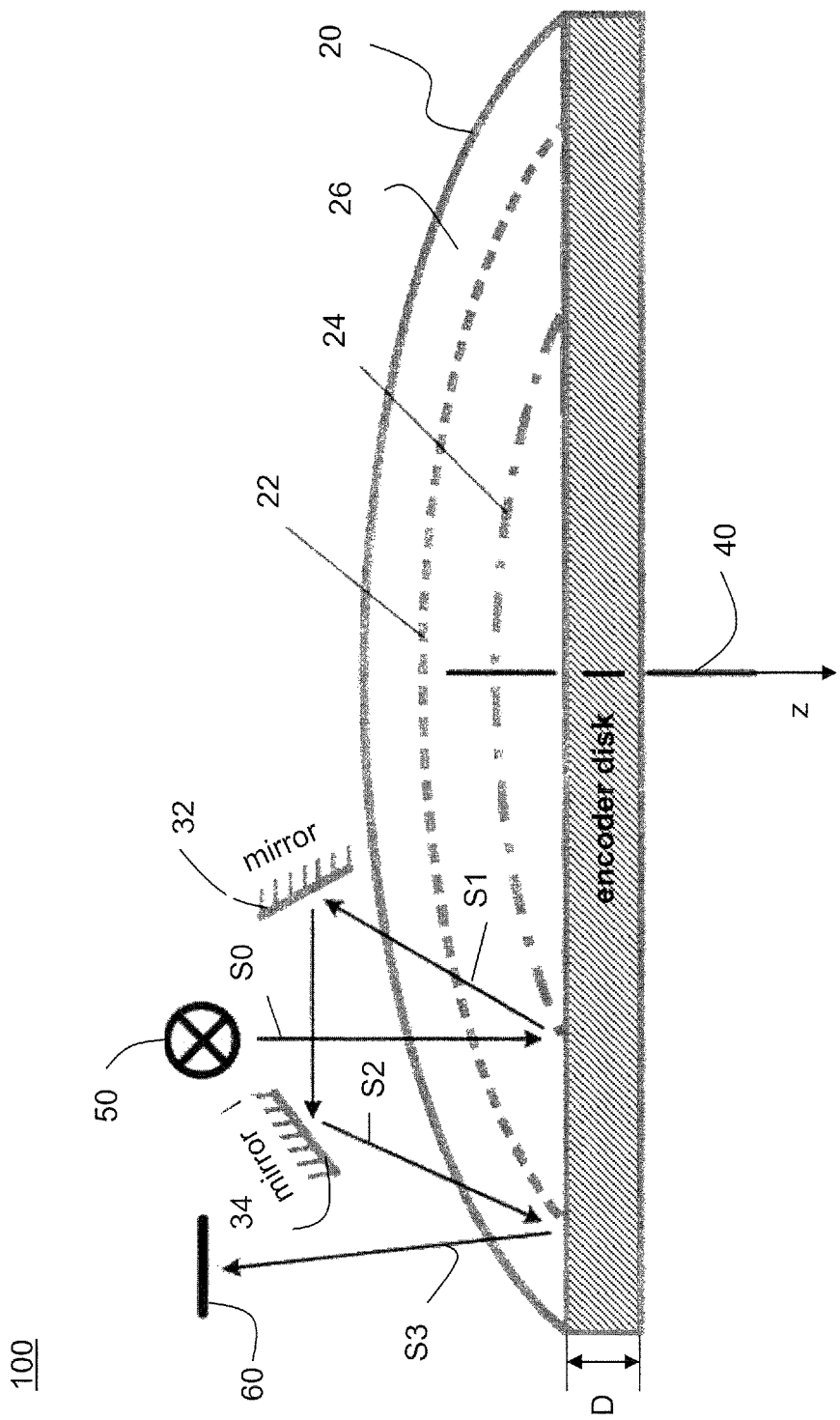
FIG. 2 shows a schematic view of a compensated rotary encoder according to an example according to the invention.

FIG. 2 shows a schematic view of a rotation angle sensor or rotary encoder 100 according to an example of the invention. The rotary encoder 100 comprises a disc-shaped round encoder disc 20 with a constant thickness. The encoder disc 20 is mounted on a shaft 40. The encoder disc 20 can be mounted rotatably in a housing (not shown in the drawings).

The encoder disc 20 may be a transparent disc, e.g. a glass or a plastic disc. The thickness D of the encoder disc in the axial direction "z" may be for example approximately 0.5 to approximately 3 mm.

A circular or annular diffractive compensating track 24 and a circular or annular diffractive measuring track 22 is applied or provided on one of the surfaces 26 of the encoder disc 20. The compensating track 24 and the measuring track 22 are each disposed in different radial zones of the encoder disc 20. In the example shown in FIG. 2 the radius of the compensating track 24 is smaller than the radius of the measuring track 22".

The compensating track 24 may be formed as a reflective refraction grating (reflection grating). The measuring track 22 may be formed as a reflective grating structure. However, it is likewise possible to form the compensating and measuring tracks 24, 22 as a transmission grating or as transmissive grating structures. The structures of the measuring track 22 and the compensating track 24 according to one embodiment are described in greater detail below in connection with FIGS. 3a to 3c.

The rotary encoder 100 also has an illumination device with a light source 50. One or more laser diodes or light-emitting diodes or another source of coherent or incoherent light can be used as light source 50. The illumination light radiated from the light source can be collimated by means of a collimator (not shown in FIG. 2) and/or focused or concentrated onto the compensating track 124 by means of one or more lenses and optionally further optical elements (not shown in FIG. 2).

The compensating track 24 of the encoder disc 20 is illuminated by an illuminating beam 32 normally or in the axial direction "z". The illumination light (readout light) S0 incident on the compensating track 24 is diffracted by the diffractive compensating tack 24. The beams of the first diffraction order S1 are deflected in the direction of the common center of the compensating track 24 and the measuring track 22 by a suitable selection of the wavelength of the illumination light and/or the grating constant of the diffractive compensating track 24. By means of an optical deflecting device comprising a first mirror 32 and a second mirror 34 and optionally further optical elements, the beams of the first diffraction order S1 of the compensating track are deflected and focused onto the measuring track. The deflection may be configured in such a way that the optical path length from the compensating track 24 to the measuring track 22 corresponds to the optical path length of the compensating track 24 to the axis of rotation thereof. The consequence of this is that the illumination S2 of the measuring track 22 always takes place at the tangential level of its axis of rotation. The beams S3 (i.e. the measurement beams) diffracted by the measuring track are sensed or detected by a detection device 50 with one or more photodetectors.

FIG. 3 shows a schematic representation of the structure and the arrangement of the measuring track and the compensating track and a representation of the encoder disc according to an embodiment, wherein FIG. 3a shows a view of a part-section of the encoder disc from above; FIG. 3b shows an enlarged view of a part-section of the measuring track; and FIG. 3c shows an enlarged view of a part-section of the compensating track.

As already state in connection with FIGS. 1 and 2, the encoder disc has a circular or annular compensating track 24 and a circular or annular measuring track 22 which are disposed in different radial zones of the encoder disc. In one example the radius of the compensating track is equal to approximately 8 mm and the radius of the measuring track is equal to approximately 13 mm. The width of the compensating track may be approximately 2 mm and the width of the measuring track may be approximately 1 mm.

The measuring track 22 may be (micro)structured in a suitable manner (e.g. a manner which is known per se), so that one or more optical parameters (e.g. intensity, phase, etc.) of the light beam or light beams reflected by the measuring track 22 (or of the light beam or light beams passing through the measuring track and/or diffracted by the measuring track) is modulated as a function of the measured angle. Angle information can be obtained from the detected signals by means of a signal evaluation device.

The measuring track 22 may comprise one or more diffraction gratings (e.g. reflection grating or transmission grating). The measuring track shown in FIG. 3c is designed as an annular pattern or an annular grating structure comprising four different diffractive nested diffraction gratings (in the concrete example, reflection gratings) 221, 222, 223 and 224. The individual diffraction gratings are each separated by unstructured fields 225. If the structure consisting of alternating fields with and without grating structure moves through the illumination spot (e.g. through a focused diffraction-limited spot of a laser diode or a light-emitting diode or another source of coherent illumination light), in each case a modulated signal is generated at the position of the first diffraction order of the respective diffraction grating. The first diffraction orders of the four diffraction gratings are spatially separated from one another by a suitable selection of the different diffraction gratings. This can be achieved in particular by different angular arrangements of the individual diffraction gratings. For example once per rotation a reference signal for zeroing on a further photodetector can be generated via a fifth diffraction grating 226.

The beams of the first diffraction orders of the respective diffraction gratings of the measuring track can be detected for example by means of photodetectors. Thus for example one photodetector in each case can be assigned to the first diffraction order of the respective diffraction gratings. Alternatively the measurement beams generated by diffraction on the measurement track can be sensed or detected by a (one- or two-dimensional) photodetector array.

The first diffraction grating 221 can for example be designed to generate a sinusoidal signal with a negative sign. By the use of the second nested grating structure or of the second diffraction grating 222, for direction detection a cosine signal is generated at the position of the first diffraction order and can be detected by means of a second photodetector.

In order to increase the stability of the output signals in operation, a total of four diffraction gratings can be provided. The third diffraction grating may be designed for example in such a way that a sinusoidal signal with a negative sign can be generated in a third photodetector, and the fourth diffraction grating 224 may for example be designed to generate a cosine signal with a negative sign. Thus a four-phase evaluation is enable with in all four photodetectors (e.g. four photodiodes).

The grating constants of the respective diffraction gratings of the measuring track may be for example 1.6 m, the distance between the individual diffraction gratings may be for example approximately 10 μm. The material as injection-compression moulded construction of the disc may be for example PC.

The diffractive compensating track may be designed as a reflection grating, as shown in FIG. 3c. The grating constant can be suitably fixed as a function of the light used for illumination, so that the beams of the Nth (e.g. the first) diffraction order are deflected in the direction of the common center of the compensating and measuring tracks. However, the compensating track may also be designed as a transmission grating.

The grating constant of the compensating track may be for example approximately 1 μm. The material as injection-compression moulded construction of the disc may be for example PC.

An example of an encoder disc for an optical rotary encoder with a diffractive compensating track has been described above. However, the compensating track can have a different structure, for example a mirror structure (e.g. a mirror surface running round at a suitable angle) or a prism structure.

The rotation angle sensors or rotary encoders described above can be used for numerous applications in rotating machine components, electric motors, in motor vehicles, e.g. for detection of the steering angle.

LIST OF REFERENCE SIGNS 10 encoder disc of a non-compensated rotary encoder
12 measuring track
12' decentered measuring track
20 modified encoder disc
22 measuring track
22' decentered measuring track
22-A part-section of the measuring track
221, 222, 223,224 diffraction grating
225 unstructured zone
226 diffraction grating to zero setting
24 compensating track
24' decentered compensating track
24-A part-section of the compensating track
26 surface of the encoder disc
30, 32, 34 mirror
40 shaft
50 light source
60 detection device (photodetector)
100 rotation angle sensor or rotary encoder
B illumination or illumination spot of the measuring track with a non-compensated rotary encoder
$B_M$ illumination or illumination spot of the measuring track with a compensated rotary encoder
S0 illumination spot on the measuring track
S1 first diffraction order
S2 deflected beams of the first diffraction order
S3 measurement beam
$R_M$ radius of the measurement beam
$R_K$ radius of the compensating track
M center point of the measuring and compensating track
M' decentered center point of the measuring and compensating track
W center point of the shaft
e decentering of the measuring track
ϕ true angle
ϕ' measured angle

The invention claimed is:

1. An optical system for an optical compensation of an angle measurement error in an optical rotary encoder, comprising:
   an encoder comprising at least one measuring track to modulate at least one optical parameter of a light beam as a function of the angle to be measured and at least one compensating track arranged concentrically with respect to the measuring track; and
   a deflecting device located relative to the encoder to direct light from the compensating track the encoder onto the measuring track of the encoder,
   wherein the components of the optical system are arranged such that
     a light beam emitted from a light source is incident on a zone of the compensating track; and
     at least a portion of the incident light beam is deflected by the compensating track in the direction of an axis through the common center of the compensating track and the measuring track and is further deflected by the deflecting device onto a scanning zone of the measuring track; and
   wherein the optical system is arranged such that, regardless of the offset between a shaft axis of the rotary encoder and the common center of the measuring track and compensating track, the measuring track is illuminated at substantially the same tangential position so long as the rotation angle of the encoder is constant.

2. An optical system as claimed in claim 1, wherein the compensating track has a diffractive structure.

3. An optical system as claimed in claim 2, wherein
   the light incident on the zone of the compensating track at a predetermined or adjustable illumination angle is divided into diffraction orders in such a way that the beams of the Nth diffraction order, where N is a whole number, are deflected in the direction of the common center of the compensating track and the measuring track.

4. An optical system as claimed in claim 2, wherein
   the light, preferably coherent light, which is incident on the zone of the compensating track at a predetermined illumination angle is divided into diffraction orders in such a way that the beams of the Nth diffraction order, where N is a whole number, are deflected tangentially with respect to the compensating track in the illuminated zone.

5. An optical system as claimed in claim 4, wherein the illumination angle is substantially 90° and/or N is equal to 1.

6. An optical system as claimed in claim 1, wherein the measuring track is a diffractive measuring track.

7. An optical system as claimed in claim 1, wherein the radius of the compensating track is smaller than or greater than or equal to the radius of the measuring track.

8. An optical system as claimed in claim 1, wherein the encoder disc is a reflection encoder disc.

9. An optical system as claimed in claim 1, further comprising a light source, wherein the deflection device is stationary relative to the light source.

10. An optical system as claimed in claim 1, wherein the encoder disc is a transmission encoder disc.

11. Optical rotary encoder comprising:
- an encoder disc having at least one measuring track for modulating at least one optical parameter of a light beam as a function of the angle to be measured and at least compensating track arranged concentrically with respect to the measuring track;
- an optical or optoelectronic scanning device for illuminating a scanning zone of the measuring, said optical or optoelectronic scanning device comprising:
- an illumination device that produces the light beam to illuminate a zone of the compensating track of the encoder disc with light, wherein at least a portion of the light beam is deflected by the compensating track in the direction of the axis through the common center of the compensating track and the measuring track;
- a deflection device for deflecting the light deflected by the compensating track onto a scanning zone of the measuring track,
  - wherein regardless of the offset between a shaft axis of the rotary encoder and the common center of the measuring track and the compensating track, the measuring track is always illuminated at substantially the same tangential position so long as the rotation angle of the encoder disc is constant.

12. Optical rotary encoder as claimed in claim 11, wherein the illumination device comprises at least one light source and wherein the deflection device is stationary relative to the light source.

13. Optical rotary encoder as claimed in claim 11, wherein
- the direction of at least one beam which is generated upon illumination of the compensating track has a point of intersection with the axis through the common center of the compensating and measuring tracks; and
- the distance between the compensating track and this point of intersection corresponds to the length of the light path between the compensating track and the measuring track.

14. Optical rotary encoder as claimed in claim 11, wherein the compensating track has a diffractive structure, and wherein at least one Nth diffraction order beam generated upon illumination of the compensating track, where N is a whole number, is deflected in the direction of the axis through the common center of the compensating track and the measuring track.

15. Optical rotary encoder as claimed in claim 11, wherein the optical path length from the compensating track to the measuring track corresponds to the optical path length from the compensating track to an axis of rotation thereof.

16. Optical rotary encoder as claimed in claim 11, further comprising a detection device for detecting at least a part of at least one optical measurement beam generated by illumination of the measuring track.

17. Optical rotary encoder as claimed in claim 11, wherein the optical rotary encoder is a transmission type optical rotary encoder.

18. Optical rotary encoder as claimed in claim 11, wherein the optical rotary encoder is an incremental rotary encoder.

19. Optical rotary encoder as claimed in claim 11, wherein the optical rotary encoder is a reflection type optical rotary encoder.

20. Optical rotary encoder as claimed in claim 11, wherein the optical rotary encoder is an absolute rotary encoder.

21. A method for optical compensation of an angle measurement error in an optical rotary encoder, comprising:
- providing an encoder disc having at least one measuring track for modulating at least one optical parameter of a light as a function of the angle to be measured and at least one at least one compensating track arranged concentrically with respect to the measuring track;
- illuminating a zone of the compensating track with light;
- deflecting at least a portion of the light incident on the compensating in the direction of the axis through the common center of the compensating and measuring tracks deflecting at least a portion of the light deflected by the compensating track onto scanning zone of the measuring track, wherein
- regardless of the offset between a shaft axis of the rotary encoder and the common center of the measuring track and the compensating track, the measuring track is always illuminated at substantially the same tangential position so long as the rotation angle of the encoder disc is constant.

22. Method as claimed in claim 21, also comprising detecting of at least a part of at least one measurement beam generated by the illumination of the scanning zone of the measuring track.

* * * * *

UNITED STATES PATENT AND TRADEMARK OFFICE
CERTIFICATE OF CORRECTION

| | | |
|---|---|---|
| PATENT NO. | : 9,068,862 B2 | Page 1 of 1 |
| APPLICATION NO. | : 13/395436 | |
| DATED | : June 30, 2015 | |
| INVENTOR(S) | : Hopp et al. | |

It is certified that error appears in the above-identified patent and that said Letters Patent is hereby corrected as shown below:

On the Title Page, in Item (57), under "ABSTRACT", in Column 2, Line 11, delete "disk (20);" and insert -- disk (20) --, therefor.

IN THE SPECIFICATION

In Column 1, Line 47, delete "evaluation:" and insert -- evaluation. --, therefor.

In Column 11, Line 45, delete "RM." and insert -- $R_M$. --, therefor.

In Column 13, Line 32, delete "22"." and insert -- 22'. --, therefor.

In Column 14, Line 5, delete "detection device 50" and insert -- detection device 60 --, therefor.

In Column 15, Line 13, delete "1.6 m," and insert -- 1.6 µm, --, therefor.

IN THE CLAIMS

In Column 17, Line 6, in Claim 11, delete "Optical" and insert -- An optical --, therefor.

In Column 17, Line 13, in Claim 11, delete "measuring," and insert -- measuring track, --, therefor.

In Column 18, Lines 26-27, in Claim 21, delete "at least one at least one" and insert -- at least one --, therefor.

In Column 18, Line 31, in Claim 21, delete "compensating" and insert -- compensating track --, therefor.

In Column 18, Lines 32-33, in Claim 21, delete "measuring tracks" and insert -- measuring tracks; --, therefor.

Signed and Sealed this
Twenty-sixth Day of January, 2016

Michelle K. Lee
*Director of the United States Patent and Trademark Office*